United States Patent
van der Eerden et al.

(10) Patent No.: US 7,931,461 B2
(45) Date of Patent: Apr. 26, 2011

(54) MOULD MEMBER FOR MOULDING THREE-DIMENSIONAL PRODUCTS, SYSTEM AND METHODS OF MANUFACTURING A MOULD MEMBER

(75) Inventors: Hendricus Franciscus Jacobus Maria van der Eerden, Gemert (NL); Wilhelmus Gerardus Maria Boom, Maashees (NL)

(73) Assignee: Stork Titan B.V., Boxmeer (NL)

( * ) Notice: Subject to any disclaimer, the term of this patent is extended or adjusted under 35 U.S.C. 154(b) by 522 days.

(21) Appl. No.: 11/987,273

(22) Filed: Nov. 28, 2007

(65) Prior Publication Data

US 2009/0134308 A1 May 28, 2009

(51) Int. Cl.
*B29C 43/08* (2006.01)
*A21C 11/00* (2006.01)

(52) U.S. Cl. .................. 425/363; 425/374; 426/512

(58) Field of Classification Search .............. 249/137; 425/363, 371, 373–374; 426/512
See application file for complete search history.

(56) References Cited

U.S. PATENT DOCUMENTS

| | | | |
|---|---|---|---|
| 2,949,713 A * | 8/1960 | Vogt | 53/453 |
| 3,205,837 A | 9/1965 | Fay | |
| 3,427,649 A | 2/1969 | Fay | |
| 3,993,727 A * | 11/1976 | Skriletz et al. | 425/420 |
| 6,811,802 B2 | 11/2004 | van Esbroeck et al. | |
| 2005/0220932 A1 | 10/2005 | van der Eerden et al. | |
| 2007/0224305 A1 | 9/2007 | Meskendahl et al. | |

FOREIGN PATENT DOCUMENTS

| | | |
|---|---|---|
| GB | 2 052 350 A | 1/1981 |
| WO | WO-2004/002229 A3 | 1/2004 |
| WO | WO-2005/107481 A2 | 11/2005 |

OTHER PUBLICATIONS

"De Ingenieur," vol. 118, Dec. 1, 2006, annex to No. 21.
"De Ingenieur," vol. 118, Dec. 1, 2007, annex to No. 21.

* cited by examiner

*Primary Examiner* — Richard Crispino
*Assistant Examiner* — Thu Khanh T Nguyen
(74) *Attorney, Agent, or Firm* — Birch, Stewart, Kolasch & Birch, LLP (57) ABSTRACT

A mould member for moulding three-dimensional products from a mass of one or more food starting materials, which are suitable for consumption, in particular human consumption, includes a body having a porous structure and a plurality of mould cavities. The mould cavities each have a mould cavity wall defined by the body and an opening in a surface of the body. The body includes at least one essentially fluid tight barrier.

27 Claims, 3 Drawing Sheets

Fig 1

Background Art

MOULD MEMBER FOR MOULDING THREE-DIMENSIONAL PRODUCTS, SYSTEM AND METHODS OF MANUFACTURING A MOULD MEMBER

TECHNICAL FIELD

A first aspect of the present invention relates to a mould member for moulding three-dimensional products from a mass of one or more food starting materials which are suitable for consumption, in particular human consumption. The invention also relates to a system comprising such a mould member, as well as to various methods of manufacturing such a mould member. Mould members are used in the processing of mass, preferably a mass having a visco-elastic behaviour such as a meat mass into three-dimensional food products like hamburgers, snacks and the like. Other edible masses, for example of fish, potato, dough, molten cheese etc can be processed similarly using a mould member according to the invention.

PRIOR ART

PCT/NL03/00470 has disclosed an embodiment of a mould member being a mould drum comprising a number of mould cavities in the outer peripheral surface of the drum. A mould cavity is delimited by a base and/or sidewalls that form the boundary of the mould cavity, wherein the boundary comprises a large number of openings. The dimensions of the openings are such that no or scarcely any of the mass of one or more food starting materials can pass through. The openings are connected to a reduced-pressure means for generating a reduced pressure in the mould cavity, while the mould cavity is filled with an appropriate amount of mass at a filling position of the system comprising the mould member. This reduces the risk of including air in the mould cavity between the boundary thereof and the mass filled, thereby increasing the accuracy and reproducibility of the shape and weight of simultaneously or subsequently shaped products. It is also known to supply pressurized air to the boundary of a mould cavity filled with mass in order to assist in releasing the shaped product from the mould cavity in addition to gravity at a release position downstream of the filling position. In an embodiment according to PCT/NL03/00470 the boundary comprises a porous structure, e.g. made from ceramics, plastics or metals including in particular sintered steel.

In a further development thereof known in the art, the mould member comprises a body having a porous structure and mould cavities provided in a surface of the body. Advantageously the surface openings not belonging to a boundary of a mould cavity are sealed in order to prevent air from escaping through these surface openings.

SUMMARY OF THE INVENTION

Now it has been found that releasing shaped products from such a mould member comprising a porous body still offers some difficulties. One of these difficulties is that while shaped products are released at the release position by blowing air through the porous boundary structure of a mould cavity, also neighbouring products not directly blown onto and located upstream of the products being released are already partially removed. This could have an adverse effect on the shape of the product e.g. due to deformation by its own weight. Additionally, the products, in particular relatively large products might fall out of the mould cavity at a wrong location which might generate difficulties in further processing of the shaped products, e.g. during battering, coating, frying, freezing and/or packaging. Furthermore, relatively small products might be released partially at one side, e.g. tilted to some extent, while the part of the product remaining in the mould cavity becomes stuck therein.

An object of the invention is to reduce the risk of premature or not intended releasing shaped products from mould cavities in a mould member.

Another object of the invention is to improve the effective release pressure on the shaped products to be removed.

Still another object of the invention is to improve the overall efficiency of the use of a pressurized fluid.

To this end the mould member according to the invention for moulding three-dimensional products from a mass of one or more food starting materials, which are suitable for consumption, in particular human consumption, comprises a body having a porous structure and a plurality of mould cavities, which mould cavities each have a mould cavity wall defined by the body and an opening in a surface of the body, wherein the body comprises at least one essentially fluid tight barrier.

The mould member according to the invention comprises a body having a porous structure and a number of mould cavities. The porous structure comprises pores or passages that are interconnected. Typically the mould cavities are recesses provided in the body. Thus parts of the body adjacent to a mould cavity form a mould cavity wall or boundary delimiting the mould cavity. The mould cavity has an opening in a surface for filling and releasing the mass of one or more food starting materials. According to the invention the mould member comprises at least one essentially fluid tight barrier. In a release position of the mould member, the fluid tight barrier prevents a fluid that is blown through the porous structure of the body in order to release a shaped mass from a mould cavity or series of mould cavities, from escaping to other mould cavities located upstream and not yet to be emptied. A fluid tight barrier also serves to prevent fluid such as air from escaping to mould cavities located downstream from which shaped product already have been removed. In other words, the fluid used is directed only to those mould cavities, from which the shaped products are to be released. Thus the invention allows for releasing shaped products from the mould cavities at the appropriate position while preventing premature releasing upstream products. Moreover, the invention offers the advantage of improving the release pressure of the fluid because undesired leakage of fluid and as a result a pressure drop is prevented. In this way the overall efficiency of the use of the fluid is also improved.

According to a second aspect the invention is embodied in a system for moulding three-dimensional products from a mass of one or more food starting materials which are suitable for consumption, in particular human consumption, which system comprises:

a production device comprising:
  a mould member according to the invention as described above,
  mass feed means for feeding the mass to the plurality of mould cavities of the mould member, the mass feed means comprising one or more mass feed members disposed along a mould member surface provided with the mould cavities, and
  fluid feed means for feeding a fluid to the mould cavities of the mould member in order to release mass from a mould cavity.

A third aspect is directed to a general method of manufacturing a mould member for moulding three-dimensional products from a mass of one or more food starting materials which are suitable for consumption, in particular human consumption, comprising the steps of providing a body having a porous structure, providing at least one essentially fluid tight barrier in the body, providing a plurality of mould cavities in the body, which mould cavities each have a mould cavity wall defined by the body and an opening in a surface of the body, wherein the steps are carried out in such a way that the essentially fluid tight barrier is arranged at least between two mould cavities.

A fourth aspect of the invention is directed to various preferred methods of manufacturing a mould member according to invention as will become apparent from the detailed description hereinafter.

BRIEF DESCRIPTION OF THE DRAWINGS

In the appended drawing

PREFERRED EMBODIMENTS OF THE INVENTION

The mould member according to the invention comprises a body having a porous structure. This structure can be made from metals, alloys, ceramics, synthetic materials like plastics and combinations thereof. A preferred body is made from a metal or metal alloy by sintering, in particular corrosion resistant steel. The basic design of the body can be a plate e.g. a rectangular one. In a surface thereof a number of mould cavities are arranged thereby providing a mould member. In a production device or system the mould member is movable, for example it can slide to and fro from a filling position to a release position. In the filling position the mould cavities are filled with a mass by one or more mass feed members arranged along the surface having the mould cavities. At the release position the shaped products are removed from the mould cavities using a fluid, usually pressurized air. For mass production a mould cylinder or drum as a mould member having a plurality of mould cavities is preferred.

Typically the plurality of mould cavities is arranged in two or more adjacent rows of at least one mould cavity. For a plate type mould member a row is defined as neighbouring mould cavities in a direction substantially perpendicular to the direction of movement from a filling position to the release position. For a cylinder type mould member a row is defined as neighbouring mould cavities in the axial direction of the cylinder. In both types of a mould member usually the mould cavities in a row will be filled simultaneously at the filling position and likewise the shaped products will be released simultaneously from the mould cavities in a row. Preferably a fluid tight barrier will be present between adjacent rows. In other words, such an embodiment of the mould member according to the invention is compartmented, each compartment comprising a part of the porous structure of the body and at least one mould cavity, while adjacent compartments and thus the mould cavities thereof are separated from each other by a fluid tight barrier. In a compartment itself it is not required to separate neighbouring cavities, because they will be emptied almost simultaneously.

In a preferred embodiment the mould member further comprises at least one fluid channel having a fluid inlet opening and a fluid outlet opening, for supplying a fluid from a fluid outlet opening through the porous structure of the body to the mould cavities. Advantageously at least one fluid channel is provided for each compartment or row of mould cavities, preferably at a position beneath a row and in a direction parallel to the row. Here, the term "fluid outlet opening" generally denotes the surface of the porous structure of the body delimiting at least partially the fluid channel. In other words, the surface pores of the porous structure act as exit of the fluid channel and as access to the porous structure.

In a further preferred embodiment thereof the fluid channel is provided in the body of the mould member. As will be explained hereinafter, fluid channels of the type described can be easily incorporated during manufacturing of the porous structure of the body.

A support member can advantageously be present in order to support the body, whether the fluid channel is present in the body or not as explained hereinafter.

In another preferred embodiment the mould member comprises a support member having a supporting surface for supporting the body at a back surface opposite to the surface of the body wherein the opening a the mould cavity is provided, and wherein the fluid channel is defined by the supporting surface of the support member and the back surface of the body. In this embodiment the mould member comprises at least two parts, a first part comprising the body and mould cavities and a second supporting part. The supporting surface of the support member in combination with the adjoining back surface of the first part together defines a fluid channel. Such an embodiment is useful where the first part is to be exchangeable, e.g. if product runs for different products, e.g. with a different shape requiring replacing the mould cavities are to be carried out. The support member also may have the function of reinforcing the porous body thereby providing a stronger mould member. Additional reinforcing elements may also be present. Furthermore, in this preferred embodiment the total thickness of the porous body can be reduced compared to the above embodiment, wherein the fluid channels are integral with the body in addition to the mould cavities, because in this preferred embodiment only the height (depth) of the mould cavities essentially defines the total thickness. The support member can be made of thin (metal) sheet bended if necessary to conform to the back surface of the body. In case of a mould drum a seamless cylinder e.g. from thin metal sheet or relatively thick plastic is preferred.

In a further advantageous embodiment thereof the back surface of the body is provided with at least one recess having recess walls defining together with the supporting surface of the support member a fluid channel.

In an alternative embodiment the support member is arranged spaced apart from the back surface of the body. In this way a gap is present, wherein sealing means e.g. as spacers are positioned to divide the gap into one or more fluid channels.

Advantageously sealing means are present between an essentially fluid tight barrier and the supporting surface of the support member, or any intermediate reinforcing element.

In the preferred cylinder type mould member the mould member comprises a mould cylinder having an axis of rotation, an inner peripheral surface and an outer peripheral surface, wherein the mould cavities have an opening in the outer peripheral surface, and the essentially fluid tight barrier extends in a radial direction, more preferably over the thickness and length of the body, preferably from the inner peripheral surface up to the outer peripheral surface. In this way the mould cylinder is structured as a compartmented cylinder, wherein the axially extending boundaries of a compartment are formed by the fluid tight barriers. In this way leakage of air to adjacent compartments is effectively excluded.

The fluid tight barrier is not limited to any particular material or shape. However, in view of manufacturing, costs and application the invention has several preferred embodiments. In a first preferred embodiment thereof the essentially fluid tight barrier comprises a fluid impermeable strip in the body, preferably incorporated during manufacturing of the porous structure of the body of the mould member. The fluid impermeable strip is made from a material which is able to withstand the manufacturing conditions used for producing the body. A strip of metal in case of manufacturing the body by sintering is advantageous in view of adhesion between the strip and the porous body structure. Preferably the fluid impermeable strip is flexible (e.g. thin or pre-shaped) prior to incorporation in the mould member. This flexible strip adapts more easily than a more rigid element to the forces applied during manufacturing of a mould member.

In a second preferred embodiment the essentially fluid tight barrier comprises a barrier layer locally impregnated in the porous structure of the mould body. Impregnation of an impregnating agent into the porous structure is a rather simple way of providing a fluid tight barrier after solidification. For example a synthetic material like plastic, such as a thermoplastic polymer, a thermosetting polymer, an elastomeric polymer, a two-component polymeric system, and molten metal alloy can be used as an impregnating agent. Advantageously the barrier layer comprises a thermoplastic material. If needed, the thermoplastic material may be removed from the porous body structure by appropriate heating, whereafter a new barrier layer may be provided by impregnation. Molten metal may also be used as impregnating agent.

In a further embodiment the fluid tight barrier comprises a locally densified part of the porous structure of the body of the mould member. By locally applying a sufficient pressure the porous structure is compressed to a solid impermeable layer. However, this kind of process is very costly and less practical than the other methods mentioned above.

In another embodiment the porous structure is locally destroyed by applying an appropriate amount of heat, such that the material melts and forms an impermeable barrier after solidification. However the accuracy of the barrier thus obtained and thus reliability of its function may leave something to be desired compared to the above preferred embodiments. In a second aspect the invention relates to a system for moulding three-dimensional products from a mass of one or more food starting materials which are suitable for consumption, in particular human consumption, which system comprises:
 a production device comprising:
  a mould member according to the invention as discussed above,
  mass feed means for feeding the mass to the plurality of mould cavities of the mould member, the mass feed means comprising one or more mass feed members disposed along a mould member surface provided with the mould cavities, and
  fluid feed means for feeding a fluid to the mould cavities of the mould member in order to release mass from a mould cavity.

The system according to the invention provides the advantages in a similar way compared to the mould member according to the invention. The embodiments of the mould member according to the invention presented above are equally applicable to the system according to the invention. Another advantage of the use of a mould member according to the invention in a system as defined above is that the remaining system components need not to be adapted. In a third aspect the invention relates to a general method of manufacturing a mould member for moulding three-dimensional products from a mass of one or more food starting materials which are suitable for consumption, in particular human consumption, comprising the steps of
providing a body having a porous structure,
providing at least one essentially fluid tight barrier in the body,
providing a plurality of mould cavities in the body, which mould cavities each have a mould cavity wall defined by the body and an opening in a surface of the body,
wherein the steps are carried out in such a way that the essentially fluid tight barrier is arranged at least between two mould cavities. This description of the steps does not present a limitation of the step sequence, as will become apparent hereinafter. Also various steps may be carried out simultaneously.

In a fourth aspect the invention is directed to preferred methods of manufacturing a mould member. In a first embodiment thereof a method of manufacturing a mould member for moulding three-dimensional products from a mass of one or more food starting materials which are suitable for consumption, in particular human consumption, the mould member comprising a body having a porous structure and a plurality of mould cavities, which mould cavities each have a mould cavity wall defined by the body and an opening in a surface of the body, wherein the body comprises at least one essentially fluid tight barrier, comprises the steps of providing a die having a die chamber defining the shape of the body to be formed, arranging a fluid impermeable strip in the die chamber at the position of the barrier to be formed, filling the remaining space of the die chamber with a particulate starting material that can be sintered, sintering the particulate starting material thereby obtaining a sintered body having a porous structure, and providing a plurality of mould cavities in a surface of the body. In this preferred method a die having a die chamber is used, which chamber has essentially the shape and dimensions of the body to be formed (i.e. without the mould cavities). In this die chamber fluid impermeable strips are arranged at each position where a fluid tight barrier is to be formed. Then the die chamber is filled with particulate material that can be sintered, in particular metal particles. Under appropriate sintering conditions such as temperature, pressure, and duration the metal particles are compressed and then sintered together in order to produce a porous structure, while at the same time the one or more strips is adhered to the porous structure. If the mould member should comprise—as discussed extensively above—at least one fluid channel having a fluid inlet opening and a fluid outlet opening, for supplying a fluid from a fluid outlet opening through the porous structure of the body to the mould cavities, as well as a support member having a supporting surface for supporting the body at a back surface opposite to the surface of the body wherein the opening of the mould cavity is provided, and wherein the fluid channel is defined by the supporting surface of the support member and the back surface of the body, the method further comprises the step of providing the support member. Preferably a section of the die defining the back surface is provided with at least one projection thereby obtaining a corresponding recess in the back surface of the body, said recess defining at least partially the fluid channel in the mould member. Advantageously the method also comprises a step of providing sealing means between an essentially fluid tight barrier and the supporting surface of the support member.

In an alternative embodiment, if one or more fluid channels are to be provided in the body of the mould member itself, one or more solid filling elements (having an outer surface that does not easily adhere to a sintered porous structure such that a filling element can be removed from an intermediate or final product) are arranged at predefined positions in the die chamber prior to filling thereof. Such filling elements could have any shape, e.g. in cross-section circular such as cylinders, rectangular, triangular, polygonal, conical etc. The filling elements could be solid such as solid rods. Inflatable elements like balloons, tubes can also be used. After sintering these filling elements are removed from the body. The passages thus obtained are the fluid channels. As after sintering the outer surface wherein the mould cavities are provided or will be provided also has an open structure, it is preferred to close or seal this surface by suitable machining of the outer surface, e.g. smearing or coating.

The preferred embodiments of the mould member discussed above, in particular the arrangement of the mould cavities in rows, the position(s) of the one or more strips and the cylindrical shape of the body are also applicable to these method embodiments.

Another preferred method of manufacturing a mould member for moulding three-dimensional products from a mass of one or more food starting materials which are suitable for consumption, in particular human consumption, the mould member comprising a body having a porous structure and a plurality of mould cavities, which mould cavities each have a mould cavity wall defined by the body and an opening in a surface of the body, wherein the body comprises at least one essentially fluid tight barrier, comprises the steps of sintering a particulate starting material in a die thereby obtaining a sintered body having a porous structure, locally impregnating the sintered body with an impregnating agent at the position of the barrier to be formed, and providing mould cavities in a surface of the body. In this preferred embodiment the fluid tight barrier can be produced after production of the body, thereby allowing flexible and correctable process. Depending on the particular porous structure (inter alia open area at surface, pore size, thickness of the body) it is advantageous to apply the impregnating agent to one surface of the body, while suction is applied to an opposite surface of the body. It will be understood that the suction will assist in the flow of the impregnating agent into the porous structure and in directing this flow in t the porous body structure itself. If deemed necessary impregnation might be carried out from both sides. An impregnated barrier layer usually has a characteristic shape. It has a broad base at the surface to which the impregnating agent was applied with a decreasing (layer) thickness in the direction of flow (compare a truncate cone). The additional or simultaneous steps discussed above for obtaining a mould member having one or more fluid channels, either using a support member or integral in the porous structure of the body itself using removable filling elements, are also applicable to this preferred method embodiment.

Impregnation may also be used to make at least part of the back surface fluid impermeable. If fluid channels are present in the body itself, then the whole back surface can be impregnated. If the fluid channels are not integral with the body, then partial impregnation is performed to allow fluid flow from a fluid channel into non-impregnated back surface parts of the body.

The preferred embodiments of the mould member discussed above, in particular the arrangement of the mould cavities in rows, the position(s) of the fluid tight barrier(s), impregnating agent and the cylindrical shape of the body are also applicable to this method according to the invention.

The invention will be further illustrated in more detail referring to the drawing.

Figure 1:
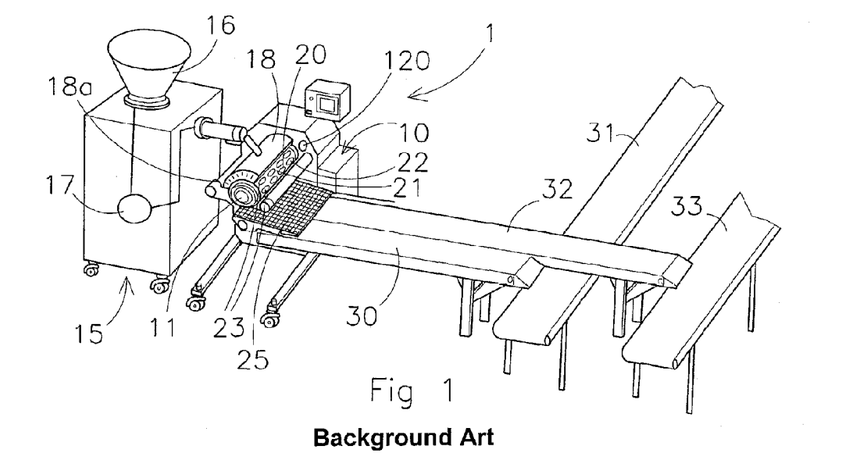
FIG. 1 shows a system for moulding three-dimensional products from a mass of food starting materials according to the invention.

FIG. 1 diagrammatically depicts an exemplary embodiment of a system according to the invention, e.g. as discussed in detail in WO2004/00229, the contents of which are hereby deemed to be incorporated. The system comprises a frame 10, advantageously moveable over the flour floor. A mould member 20 being a mould drum 20, as will be explained in more detail below, is supported by the frame 10. The mould drum 20 has a mould surface 21 at the outer circumference. This surface 21 has a number of mould cavities 22, which are arranged as rows 23 extending in the axial direction of the mould drum 20. The frame 10 is provided with a horizontal mould drum fitting spindle, so that the mould drum 20 is rotatable with respect to the frame 10 about the spindle. In an embodiment which is not shown, the frame may have a plurality of mould drum fitting spindles, or the frame comprises other support means for supporting the mould drum 20 rotatably with respect to the frame 10. At one end, the fitting spindle is fixed to the frame 10, so that the mould drum 20 can be pushed onto the fitting spindle 11 and removed from the free end. Furthermore, the frame 10 is provided with mould drum drive means for rotating the mould drum. A statically disposed distributor, suitable for supplying or sucking out a liquid or gaseous forcing agent, such as air, compressed air, water or steam or the like, is arranged in the vicinity of the mould drum drive means. A distributor which is known per se is provided with a pump and slots through which the forcing agent can flow. On account of the distributor being disposed in a static position, the rotating mould drum alternately moves past forcing agent feed slots and forcing agent discharge slots. Furthermore, the production device 1 has a mass feed part 15, which is likewise designed such that it can be moved over the floor and is provided with a storage container 16 for the mass, in this example a (kneaded) meat mass, pump means 17 (illustrated highly diagrammatically) for pumping the mass, and a mass feed member 18 connected to the pump means 17. At a mass feed position, the mass feed member 18 bears against the outer circumference of the mould drum 20, so that (meat) mass can be fed to the passing mould cavities 22 of the rotating mould drum 20 under a filling pressure. In this example, the mass feed member 18 is supported pivotably by means of a support spindle 18a on the frame 10. Here, the frame 10 is also provided with a discharge member 25 for discharging the moulded products, in this case in the form of a (mesh) belt conveyor 25 which extends as far as beneath the mould drum 20, so that products which have been ejected from the mould cavities 22 in the region of the underside of the belt pass onto the said belt conveyor 25. The system comprises further product conveyor means, in this case two sets of belt conveyors 30, 31 and 32, 33, for discharging moulded products, if appropriate to further product treatment devices.

Figure 2:
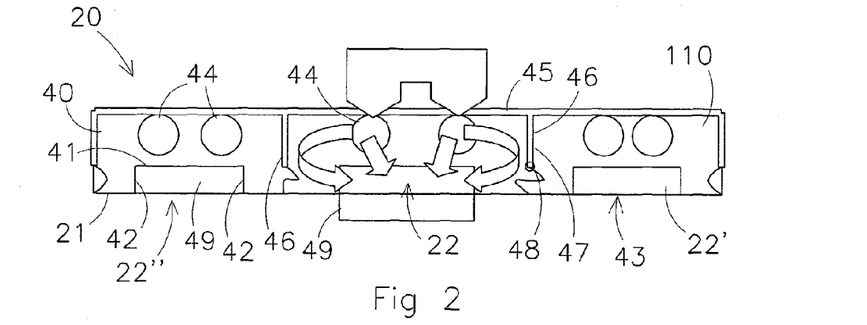
FIG. 2 shows an embodiment of a mould member according to the invention illustrating the basic principles.

FIG. 2 depicts the basic principles of the invention. The mould member 20 comprises a body 40 having a porous structure, e.g. a sintered body of corrosion resistant steel. In the mould surface 21 of the body 40 the mould cavities 22 are provided as recesses. The bottom 41 and upright walls 42 thereof are defined by the body 40. The opening 43 of a mould cavity 22 provides access for filling the mould cavity 22 with a mass of food starting materials and for discharging the shaped product. In the embodiment shown two fluid channels 44 extending in the direction of a row 23 of mould cavities 22, for feeding pressurized fluid like air are arranged between the bottom 41 of a mould cavity 22 and a solid backing member 45 e.g. from corrosion resistant steel. The fluid channels 44 are delimited by the porous body structure such that fluid can flow from the fluid channels 44 through the porous structure. In this embodiment fluid impermeable strips 46 as a fluid tight barrier e.g. from corrosion resistant steel are provided between adjacent rows 23 of mould cavities 22. A strip 46 extends through the body 40 between the backing member 45 and the opposite mould surface 21, wherein the mould cavities 22 are provided, thereby preventing the escape of fluid to already emptied mould cavities 22' in a neighbouring downstream row (right hand) as well as to a still filled neighbouring mould cavities 22" in an upstream row (left hand). As surface pores of the porous structure of the body 40 are usually sealed, the fluid supplied can flow out of the mould member 20 via the porous bottom 41 and upright walls 42 of the mould cavities 22 associated with these fluid channels 44. A strip 46 comprises a first straight part 47 extending from the backing member 45 half way into the porous body structure and a second wavy part 48 extending from the first part 47 up to the mould surface 21 of the body 40. As is indicated by arrows, fluid supplied to the fluid channels 44 flows through the porous structure of the body 40 only to the mould cavity 22 (or row of mould cavities), as the associated strips 46 prevent leakage to other mould cavities 22' and 22" in order to eject a shaped product 49.

Figure 3:
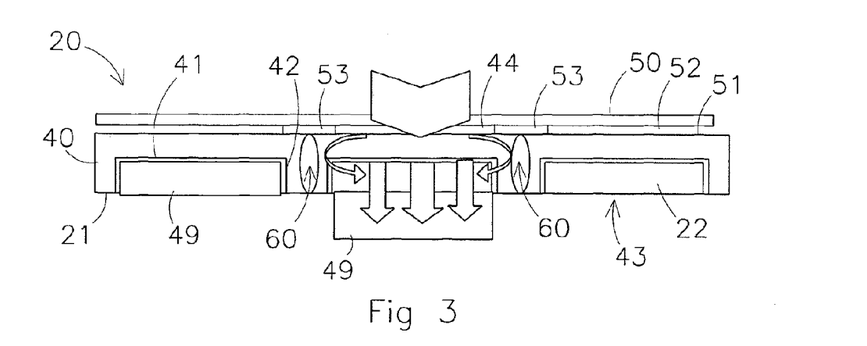
FIG. 3 shows a schematic view of another embodiment of a mould member according to the invention.

FIG. 3 shows an alternative embodiment. Similarly to FIG. 2, the mould member 20 comprises a body 40 having a porous structure. In a mould surface 21 thereof rows 23 of mould cavities 22 are provided, of which in the cross-section of FIG. 3 only one of each row is shown. A mould cavity 22 has a bottom 41 and upright walls 42 defined by the porous structure of the body 40, as well as an opening 43 in said mould surface 21. A support member 50 is provided at the back surface 51 of the body 40 opposite to the mould surface 21 having the mould cavities 22, leaving clear a small gap 52. In the gap 52 ribs 53 are positioned. These ribs 53 may also be integral parts of the support member 50 or of the body 40. Thus for each row 23 of mould cavities 22 at least one fluid channel 44 is defined by the support member 50, ribs 53 and body 40. As is shown, between adjacent rows 23 of mould cavities 22 a fluid tight barrier is provided by means of a fluid impermeable layer 60 of an impregnating agent. Fluid fed into a fluid channel 44 flows through the porous body structure to a mould cavity 22 and ejects a shaped product through the opening 43. The layer 60 is made by impregnating e.g. a fluid polymer e.g. a heated thermoplastic into the porous structure of the body 40 and subsequent cooling thereof thereby solidifying the thermoplastic. Alternatively a thermosetting polymer can be impregnated, which is cured by heat, e.g. by immersing in a hot medium like a hot water bath.

Figures 4, 5, 6:
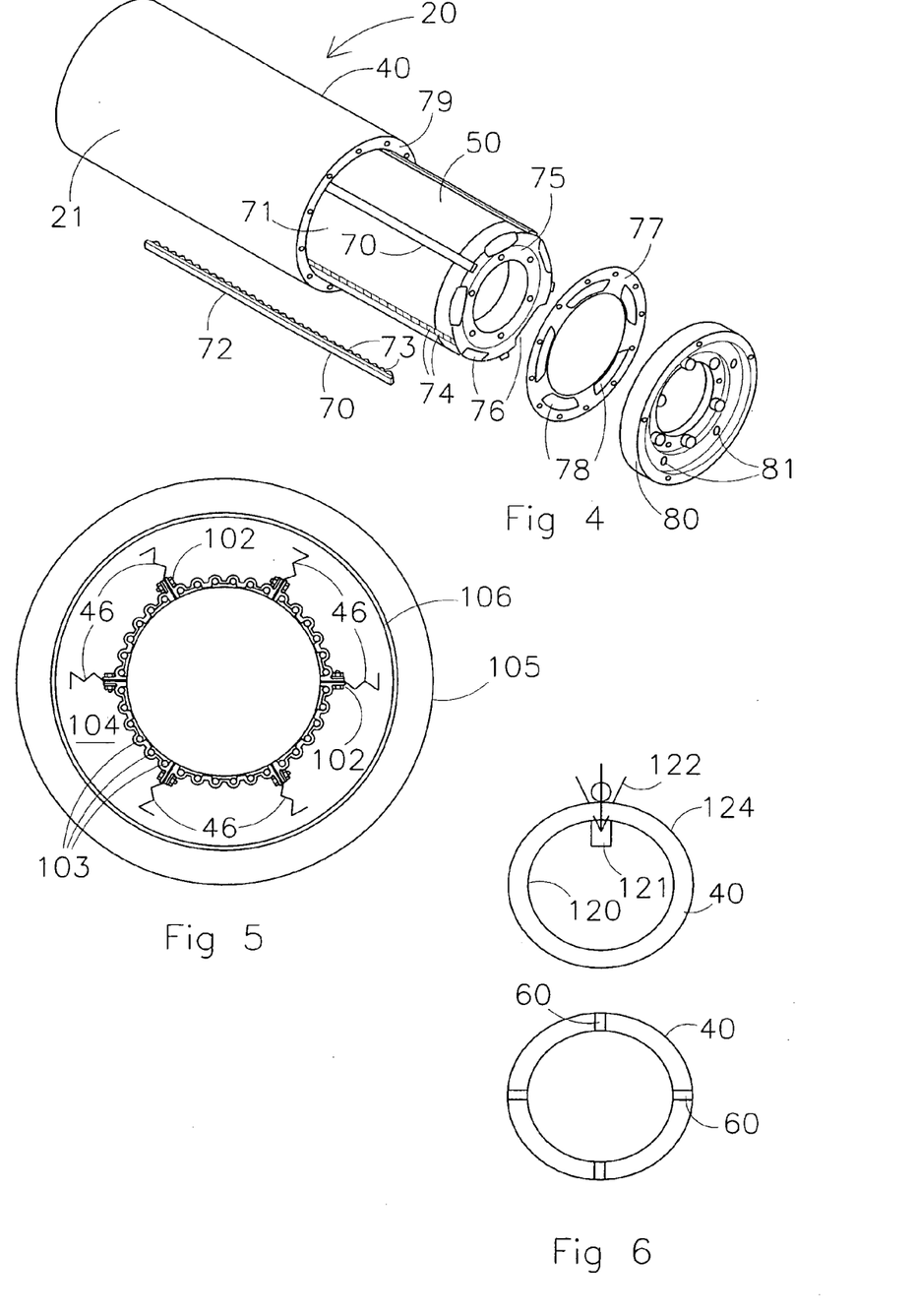
FIG. 4 shows a schematic view of yet another embodiment of a mould member according to the invention.
FIG. 5 shows a first embodiment of a method of manufacturing a mould member according to the invention.
FIG. 6 shows a second embodiment of a method of manufacturing a mould member according to the invention.

FIG. 4 shows an exploded view of another alternative embodiment of a mould member 20 according to the invention. The mould member 20 comprises an outer cylindrical body 40 having a porous structure, in the outer circumferential mould surface 21 thereof the mould cavities (not shown) are to be provided. An inner tubular support member 50 having an outer diameter corresponding to the inner diameter of the outer cylindrical body 40 is provided with sealing profiles 70 spaced apart about the outer circumference 71. The sealing profile 70 comprises a strip 72 parallel to the longitudinal axis of the support member 50. At the bottom side the sealing profile 70 has a number of projections 73 which in a mounted state are inserted in matching holes 74 in the outer circumference 71 of the support member 50. One end wall 75 of the support member 50 is provided with fluid inlet recesses 76. An annular gasket 77 having a number of passages 78 corresponding to the fluid inlet recesses 76 covers the end wall 75 of the support member 50 and the end wall 79 of the outer cylindrical body 40. An end ring 80 is mounted on the gasket 77 and is provided with a number of fluid connectors 81 for connecting to a fluid source (not shown). The fluid connectors 81 are in fluid communication with the fluid inlet recesses 76 via the passages 78. The opposite end walls of the support member 50 and outer cylindrical body 40 are sealed in a similar way, e.g. by an annular gasket and end ring (both not shown). As usually fluid is only introduced from one end, either this gasket and end ring will not be provided with fluid passages and connectors respectively or such passages and/or connectors will be closed.

FIG. 5 illustrates an embodiment of a preferred method of manufacturing a mould member according to the invention. A cylindrical tube 101 having a number of radially extending projections 102 is slid over a solid core (not shown) having an outer diameter corresponding to the inner diameter of a cylindrical body to be sintered. At those positions where fluid channels are to be provided in the cylindrical body to be sintered temporary filling elements 103, such as cylindrical solid rods of hardened steel are arranged. On top of the radially extending projections 102 flexible, pre-shaped strips 46 are mounted e.g. by clamping as shown. This assembly is placed in a cylindrical die chamber 104 of a die. A flexible outer cylinder 106 e.g. made of rubber is arranged along the outer circumferential wall 107 of the die chamber 104. Sintering powder (not shown) of corrosion resistant metal is poured in the die chamber 104 between the assembly and the flexible outer cylinder 106. Then the die 105 is subjected to a high pressure, thereby compressing the sintering powder into a cylindrical body having a porous structure. The pre-shaped flexible strips 46 are also compressed and approximately achieve the diameter of the body. The solid rods 103 are removed. Thereafter sintering can be carried out using a standard process, thereby obtaining a cylindrical body having a sintered porous structure and fluid channels. Compare FIG. 2. Then the cylindrical body is machined to a diameter as desired. Due to this machining the outer circumferential mould surface of the body is sealed due to smearing of the pores opening in the outer circumferential surface. Then mould cavities are made in the outer circumferential surface of the body e.g. by spark erosion and/or milling. In this way a mould member is manufactured having radially and axially extending compartments 110 (see FIG. 2), wherein the compartments 110 are separated by a strip 46 in a fluid tight manner. At the outer surface 21 each compartment 110 is provided with an axially extending row 23 of mould cavities 22. Compare FIGS. 1 and 2.

FIG. 6 shows another preferred embodiment of manufacturing a mould member according to the invention. An annular body 40 is prepared by sintering from metal powder thereby obtaining a porous structure. At the inner surface 120 a suction member 121 e.g. a vacuum pump, having a small suction orifice extending in axial direction of the annular body 40 is arranged at a position where a fluid tight barrier is to be formed. Opposite to the suction member an injecting device 122 for impregnating is arranged at the outer circumference 124 of the annular body 40. A fluid thermosetting polymer as impregnating agent is injected in the porous body structure by the injecting device 122, while air is removed from the porous body structure by the suction member 121. As a result the impregnating agent flows locally through the porous body structure in a radial direction. Upon application of heat the thermosetting polymer is cured, as a result a fluid impermeable layer 60 is obtained. Thereafter the outer circumference can be machined and mould cavities can be provided, similar to the explanation presented above with respect to FIG. 5. Compare FIG. 3.

In an alternative impregnating method according to the invention the full sintered body is impregnated. Thereafter excess impregnating agent is blown out using jets of pressurized fluid, except at those positions where the fluid tight barriers are to be prepared. Then the remaining impregnated material can be hardened or otherwise solidified as described above.

Figure 7:
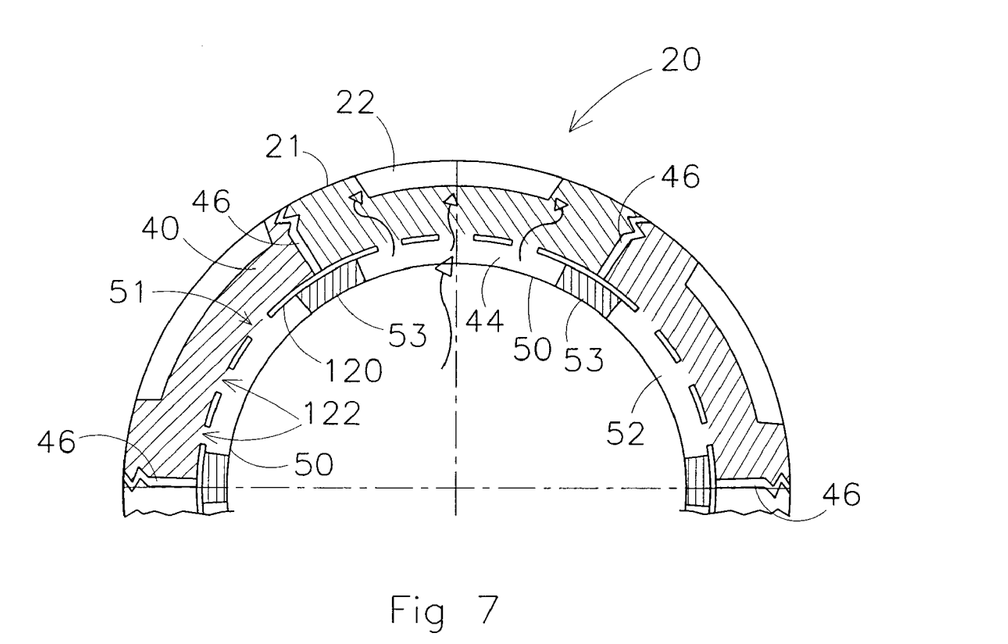
FIG. 7 shows a further embodiment of a mould member according to the invention.

FIG. 7 shows diagrammatically a further embodiment of a mould member 20. In this embodiment the mould member 20 comprises a cylindrically shaped body 40 having a porous structure, wherein the outer mould surface 21 is provided with rows 23 of mould cavities 22. Fluid impermeable strips 46 having a radial zigzag end section are provided in the body 40 in order to separate adjacent rows 23 from each other regarding fluid flow. The inner or back surface 51 of the body 40 is supported by a tubular reinforcing member 120 having passages 122, e.g. axially extending slits. The inner ends of strips 46 essentially contact the reinforcing member 120 if necessary using sealing means, thereby effectively preventing fluid flow. A tubular support member 50 is provided at a small distance from the reinforcing member 120, leaving clear a gap 52. At the position of the strips 46, ribs or blocks 53 of a sealing material are mounted in the gap 52, thereby defining a plurality of fluid channels 44. The arrows indicate the flow of fluid from a fluid channel 44 through the passages 122 and the porous structure of the body 40 towards a mould cavity 22.

Figure 8:
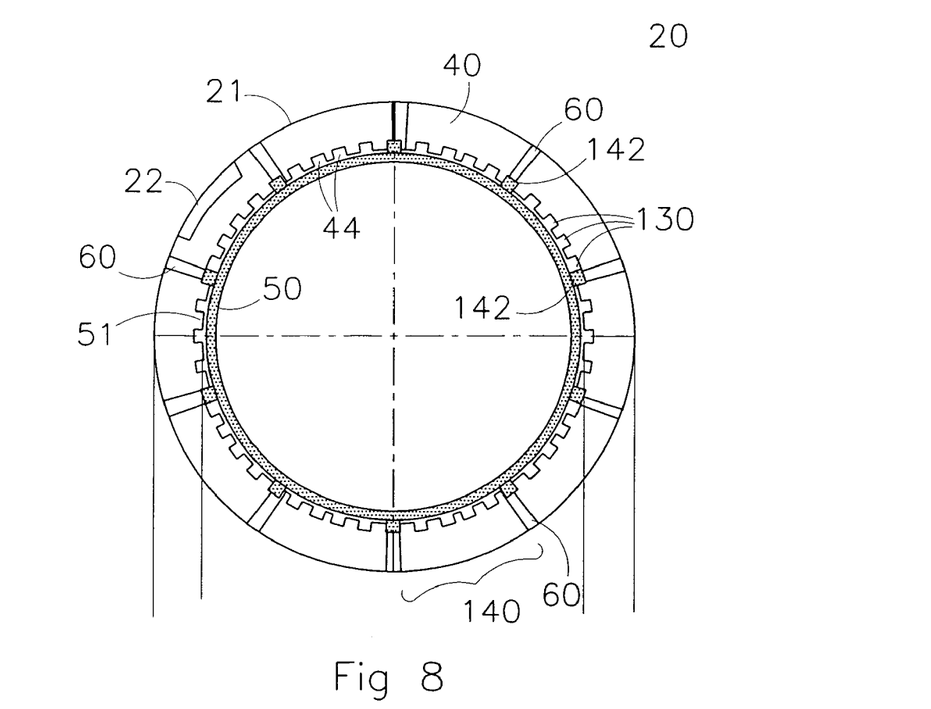
FIG. 8 shows a still further embodiment of a mould member according to the invention.

FIG. 8 shows diagrammatically a still further embodiment of the invention. In this embodiment the mould member 20 is a mould drum comprising a tubular support member 50 and a body 40 having a porous structure. The outer mould surface 21 of the body 40 is provided with axially extending rows 23 of mould cavities 22 (only one shown). Adjacent rows 23 are separated by radial fluid tight layer(s) 60 of an impregnating agent. In this embodiment the back surface 51 has a number of recesses 130, the walls and bottom of each recess defining a fluid channel 44. In order to prevent leakage of fluid from one compartment or arc section 140 of the body 40 to, an adjacent compartment sealing means 142 e.g. strips are provided in those recesses directly beneath a layer 60. It will be apparent that the number of fluid channels 44 per compartment, 140, as well as the number of rows 23 of mould cavities 22 per compartment 140 may vary. Advantageously, there is one row 23 per compartment 140 in order to benefit optimally from the invention.

The invention claimed is:

1. A mould member for moulding three-dimensional products from a mass of one or more food starting materials, which are suitable for human consumption, the mould member comprising:
   a porous body of a monolithic structure having a mould member surface and an opposite surface;
   a plurality of mould cavities formed by making recesses in the mould member surface of the porous body, each of the plurality of mould cavities each having a mould cavity wall defined by the porous body and open in the mould member surface; and
   at least one essentially fluid tight barrier extending over a thickness and length of the porous body from the mould member surface to the opposite surface,
   wherein the porous body has a thickness between the mould member surface and the opposite surface, which is equal to or larger than a depth of the recesses formed in the mould member surface.

2. The mould member according to claim 1, wherein the plurality of mould cavities is arranged in at least two adjacent rows of mould cavities, the essentially fluid tight barrier being provided between the adjacent rows of mould cavities.

3. The mould member according to claim 1, wherein the mould member further comprises at least one fluid channel having a fluid inlet opening and a fluid outlet opening, for supplying a fluid from a fluid outlet opening through the porous structure of the body to the mould cavities.

4. The mould member according to claim 3, wherein the fluid channel is provided in the body.

5. The mould member according to claim 3, wherein the mould member comprises a support member having a supporting surface for supporting the body at a back surface opposite to the surface of the body wherein the opening of the mould cavity is provided, and wherein the fluid channel is defined by the supporting surface of the support member and the back surface of the body.

6. The mould member according to claim 5, wherein the back surface is provided with at least one recess having recess walls defining together with the supporting surface of the support member a fluid channel.

7. The mould member according to claim 5, wherein sealing means are provided between an essentially fluid tight barrier and the supporting surface of the support member.

8. The mould member according to claim 1, wherein the mould member comprises a mould cylinder having an axis of rotation, an inner peripheral surface and an outer peripheral surface, wherein the mould cavities have an opening in the outer peripheral surface, and the essentially fluid tight barrier extends in a radial direction.

9. The mould member according to claim 8, wherein the essentially fluid tight barrier extends from the inner peripheral surface to the outer peripheral surface.

10. The mould member according to claim 1, wherein the essentially fluid tight barrier comprises a fluid impermeable strip.

11. The mould member according to claim 10, wherein the fluid impermeable strip is made from a flexible material.

12. The mould member according to claim 1, wherein the plurality of mould cavities is arranged in at least two adjacent rows of mould cavities, and the at least one essentially fluid tight barrier is provided in the porous body between the adjacent rows of mould cavities, the barrier layer is impregnated over the thickness and length of the porous body from the mould member surface to the opposite surface.

13. The mould member according to claim 11, wherein the barrier layer comprises a synthetic material, a metal, metal alloy or combination thereof.

14. A system for moulding three-dimensional products from a mass of one or more food starting materials which are suitable for human consumption, which system comprises:
   a production device comprising:
      a mould member according to claim 1;
      a mass feed device configured to feed the mass to the plurality of mould cavities of the mould member, the mass feed device comprising one or more mass feed members disposed along a mould member surface provided with the mould cavities; and a fluid feed device configured to feed a fluid to the mould cavities of the mould member in order to release the mass from a mould cavity.

15. The system according to claim 14, wherein the plurality of mould cavities are arranged in at least two adjacent rows of mould cavities, the essentially fluid tight barrier being provided between the adjacent rows of mould cavities.

16. The system according to claim 14, wherein the fluid feed device comprise a pressurized fluid source and at least one fluid channel in the mould member having a fluid inlet opening connected to the pressurized fluid source, and a fluid outlet opening, for supplying a fluid from a channel outlet opening through the porous structure of the mould body to the mould cavities.

17. The system according to claim 14, wherein the mould member comprises a mould cylinder having an axis of rotation, an inner peripheral surface and an outer peripheral surface, wherein the mould cavities have an opening in the outer peripheral surface, and the essentially fluid tight barrier extends in a radial direction from the inner peripheral surface to the outer peripheral surface.

18. The system according to claim 14, wherein the essentially fluid tight barrier comprises a fluid impermeable strip.

19. A system for moulding three-dimensional products from a mass of one or more food starting materials which are suitable for human consumption, which system comprises:
a production device comprising:
a mould member according to claim 12;
a mass feed device configured to feed the mass to the plurality of mould cavities of the mould member, the mass feed device comprising one or more mass feed members disposed along a mould member surface provided with the mould cavities; and
a fluid feed device configured to feed a fluid to the mould cavities of the mould member in order to release the mass from a mould cavity.

20. The system according to claim 17, wherein the barrier layer comprises a synthetic material, a metal, metal alloy or combination thereof.

21. The mould member according to claim 10, wherein the fluid impermeable strip in the body is incorporated during manufacturing of the porous structure thereof.

22. The system according to claim 18, wherein the fluid impermeable strip in the body is incorporated during manufacturing of the porous structure thereof.

23. The mould member according to claim 1, wherein the plurality of mould cavities is arranged in at least two adjacent rows of mould cavities, and the at least one essentially fluid tight barrier is provided in the porous body, between the adjacent rows of mould cavities, comprising a locally densified part of the porous body over the thickness and length of the porous body from the mould member surface to the opposite surface.

24. The mould member according to claim 1, wherein the plurality of mould cavities is arranged in at least two adjacent rows of mould cavities, and the at least one essentially fluid tight barrier is provided in the porous body, between the adjacent rows of mould cavities, comprising a locally destroyed part of the porous body over the thickness and length of the porous body from the mould member surface to the opposite surface.

25. A system for moulding three-dimensional products from a mass of one or more food starting materials which are suitable for human consumption, which system comprises:
a production device comprising:
a mould member according to claim 23;
a mass feed device configured to feed the mass to the plurality of mould cavities of the mould member, the mass feed device comprising one or more mass feed members disposed along a mould member surface provided with the mould cavities; and
a fluid feed device configured to feed a fluid to the mould cavities of the mould member in order to release the mass from a mould cavity.

26. A system for moulding three-dimensional products from a mass of one or more food starting materials which are suitable for human consumption, which system comprises:
a production device comprising:
a mould member according to claim 24;
a mass feed device configured to feed the mass to the plurality of mould cavities of the mould member, the mass feed device comprising one or more mass feed members disposed along a mould member surface provided with the mould cavities; and
a fluid feed device configured to feed a fluid to the mould cavities of the mould member in order to release the mass from a mould cavity.

27. The mould member according to claim 1, wherein the mould cavities are formed by making recesses by spark erosion and or milling.

* * * * *